United States Patent
Chen et al.

(10) Patent No.: US 10,279,738 B1
(45) Date of Patent: May 7, 2019

(54) VEHICLE LAMP ASSEMBLY

(71) Applicant: Ford Global Technologies, LLC, Dearborn, MI (US)

(72) Inventors: Linsheng Chen, Novi, MI (US); Wei Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 15/789,544

(22) Filed: Oct. 20, 2017

(51) Int. Cl.
| | | |
|---|---|---|
| *B60Q 3/74* | (2017.01) | |
| *B60R 7/04* | (2006.01) | |
| *F21V 7/04* | (2006.01) | |
| *F21V 5/04* | (2006.01) | |
| *F21V 3/00* | (2015.01) | |
| *F21V 23/00* | (2015.01) | |
| *B60R 11/02* | (2006.01) | |
| *B60Q 3/82* | (2017.01) | |
| *B60R 13/02* | (2006.01) | |

(52) U.S. Cl.
CPC ............... *B60Q 3/74* (2017.02); *B60R 7/04* (2013.01); *F21V 3/00* (2013.01); *F21V 5/04* (2013.01); *F21V 7/041* (2013.01); *F21V 23/005* (2013.01); *B60Q 3/82* (2017.02); *B60R 11/0217* (2013.01); *B60R 11/0247* (2013.01); *B60R 13/02* (2013.01); *B60Y 2304/05* (2013.01)

(58) Field of Classification Search
CPC .............. G02B 3/08; G02B 2003/0093; G02B 3/02–04; B60Q 3/74; B60Q 3/76; F21V 5/00–10
USPC ........................................................ 362/339
See application file for complete search history.

(56) References Cited

U.S. PATENT DOCUMENTS

| | | | |
|---|---|---|---|
| 4,421,355 A | 12/1983 | Marcus | |
| 5,582,474 A | 12/1996 | Van Order et al. | |
| 6,283,621 B1 | 9/2001 | Macri | |
| 8,047,673 B2 | 11/2011 | Santoro | |
| 2004/0070989 A1* | 4/2004 | Amano | F21V 7/0091 362/520 |
| 2014/0153223 A1* | 6/2014 | Lin | G02F 1/133603 362/97.3 |

FOREIGN PATENT DOCUMENTS

WO          9900623          1/1999

* cited by examiner

*Primary Examiner* — Sean P Gramling
(74) *Attorney, Agent, or Firm* — Vichit Chea; Price Heneveld LLP (57) ABSTRACT

A lens for a lamp assembly is provided herein. The lens has a radial portion including a plurality of grooves extending radially from a central point and a plurality of concentrically aligned channels intersecting the plurality of grooves. The outer channel and two adjacent grooves define a sector. Each sector includes one or more ridges. A central portion of the lens includes a generally flat outer surface.

15 Claims, 11 Drawing Sheets

VEHICLE LAMP ASSEMBLY

FIELD OF THE INVENTION

The present disclosure generally relates to vehicle lamps, and more particularly, to vehicle lamps employing various lenses.

BACKGROUND OF THE INVENTION

Lamp assemblies are commonly employed in vehicles to provide various lighting functions. For some vehicles, it may be desirable to have a more efficient lamp assembly that may be manufactured at reduced costs when compared to current overhead console lamp assemblies.

SUMMARY OF THE INVENTION

According to one aspect of the present disclosure, a lens for a lamp assembly is provided herein. The lens includes a base structure defining a radial portion including a plurality of grooves extending radially from a central point and a plurality of concentrically aligned channels intersecting the plurality of grooves. An outer channel and two adjacent grooves define a sector. Each sector includes one or more ridges. A central portion of the base structure includes a generally flat outer surface.

According to another aspect of the present disclosure, an overhead console for a vehicle is provided herein. The overhead console includes a light source operably coupled to a reflector. A first lens operably is coupled with the reflector and includes a central portion with a generally flat outer surface and a radial portion with a plurality of grooves extending radially from a central point and a plurality of concentrically aligned channels intersecting the plurality of grooves.

According to yet another aspect of the present disclosure, an overhead console for a vehicle is provided herein. The overhead console includes a light source is operably coupled with a base structure. The base structure includes a plurality of grooves extending radially from a central point and a plurality of concentrically aligned channels intersecting the plurality of grooves.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
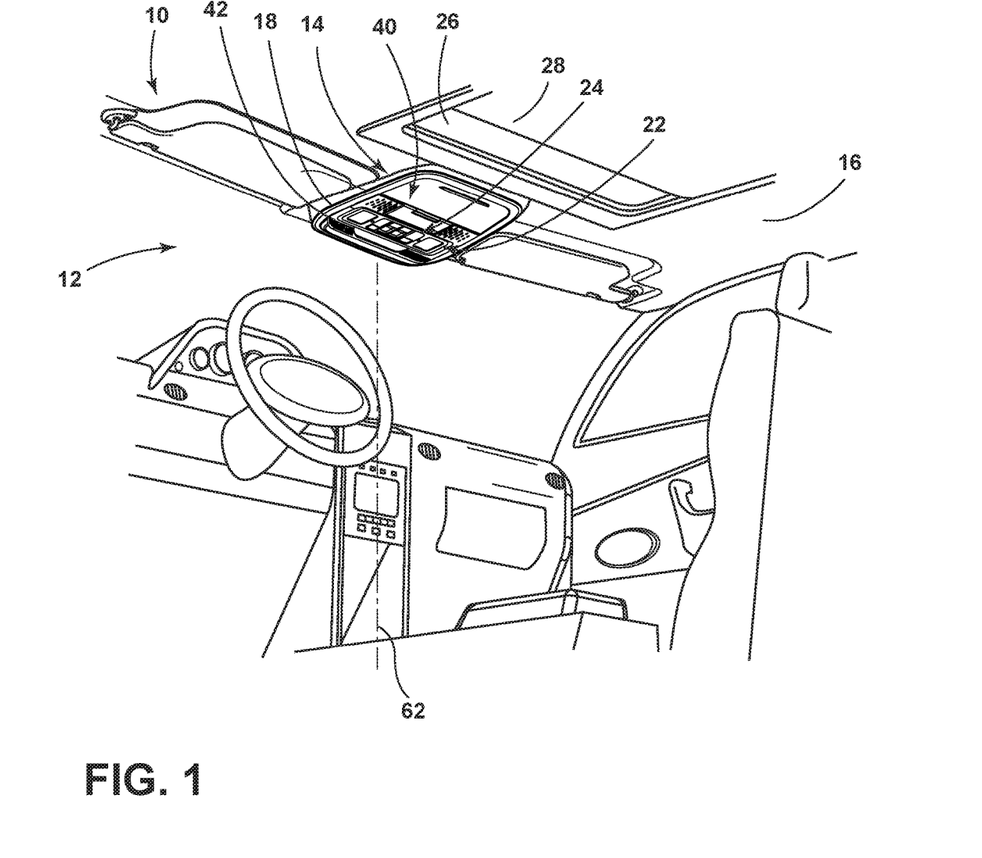
FIG. 1 is a perspective view of a front portion of a vehicle compartment having an overhead console therein, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lamp assembly that may be utilized within a vehicle and/or within an overhead console. The lamp assembly may incorporate a reflector that may be integrally formed with one or more components of overhead components. The reflector may be operably coupled with a lens that includes a spider-web pattern. The spider-web pattern may be disposed on a radial portion of the lens and a central portion may have varied optics to create unique styling of the lamp assembly and/or desired performance.

Figure 2:
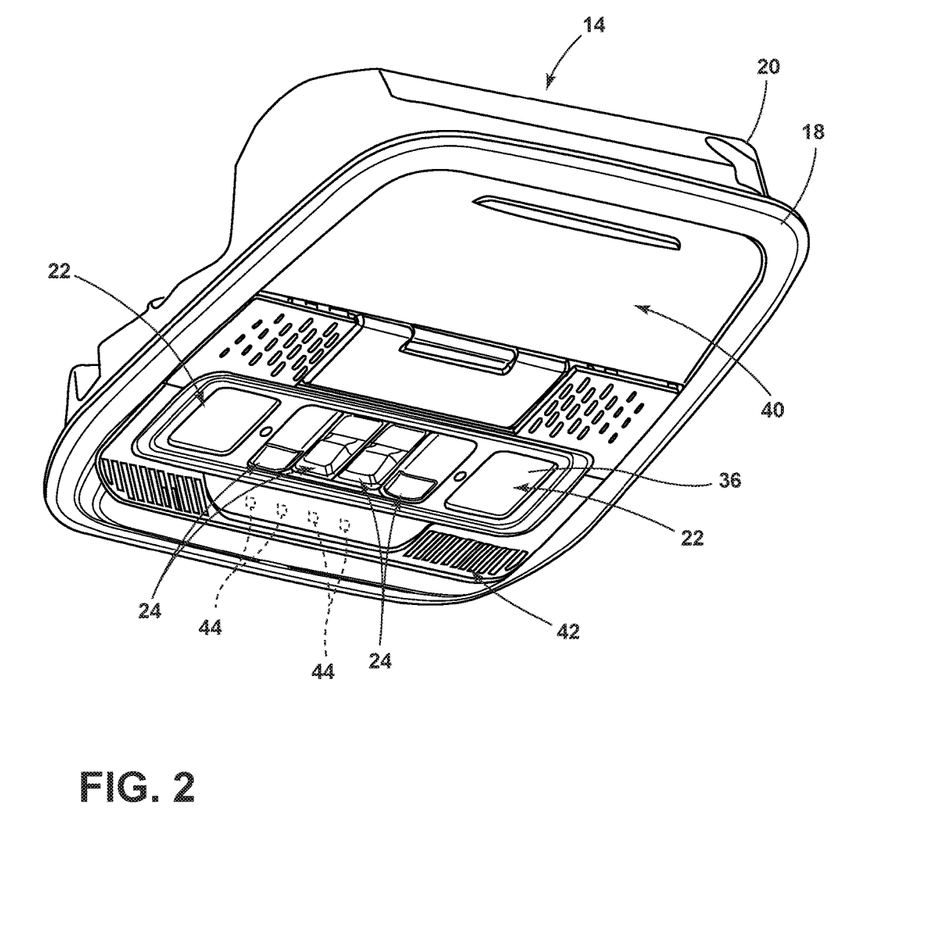
FIG. 2 is a bottom perspective view of the overhead console having a pair of lamps therein, according to some examples.
Figure 3:
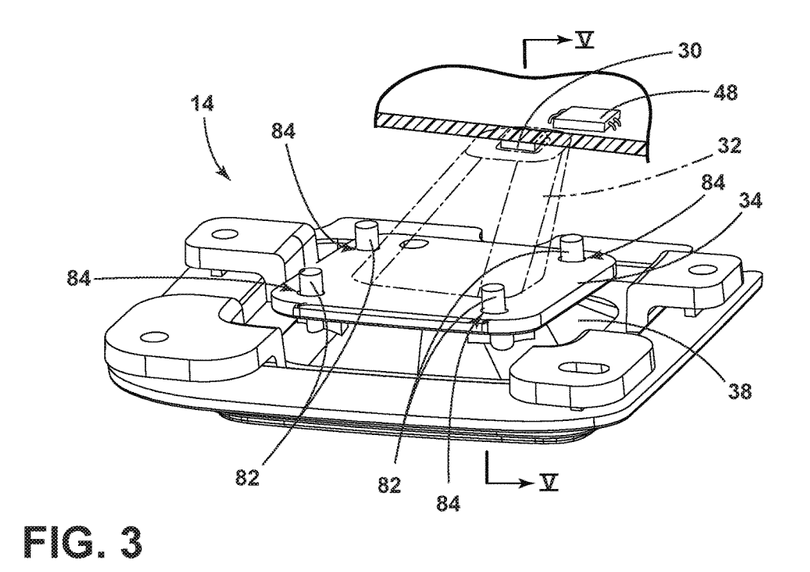
FIG. 3 is a side perspective view of a lamp within the overhead console employing a reflector, according to some examples.

Referring to FIGS. 1-3, an interior of an automotive vehicle 10 is generally illustrated having a passenger compartment 12 and an overhead console 14 disposed within the passenger compartment 12. The overhead console 14 is assembled to a headliner 16 on an underside of a roof or ceiling of the vehicle passenger compartment 12, generally above a front passenger seating area. It will be appreciated, however, that the overhead console 14 may be disposed in any other location of the vehicle 10 without departing from the scope of the present disclosure.

The overhead console 14 includes a housing 18 and a substrate 20 that define a cavity therebetween. A wide range of assemblies may be disposed within the cavity. For example, one or more lamp assemblies 22 and/or one or more switches 24 may be disposed in the cavity. The one or more switches may control any of a number of vehicle devices and functions, such as controlling the movement of a sunroof or moonroof 26, controlling the movement of a moonroof shade 28, controlling activation of one or more lamp assemblies 22, and various other devices and functions. The switches 24 may include electrical switches in communication with a variety of vehicle systems and in some examples may include biased switches or toggle switches. The lamp assemblies 22 may be configured as interior map/reading lights, dome lights, ambient lights, and/or any other type of light without departing from the scope of the present disclosure. The lamp assemblies 22 may include a light source 30, a reflector 32, one or more lenses 34, 36 (FIG. 4A), and/or a trim member 38.

The switches 24 shown in FIGS. 1 and 2 each provide control of a vehicle component or device or provide a designated control function. One or more of the switches 24 may be dedicated to controlling the movement of a sunroof or moonroof 26 so as to cause the moonroof 26 to move in an open or closed direction, tilt the moonroof, or stop the movement of the moonroof based upon a control algorithm. One or more other switches 24 may be dedicated to controlling the movement of a moonroof shade 28 between open and closed positions. Each of the moonroof 26 and shade 28 may be actuated by an electric motor in response to actuation of the corresponding switch 24. Other switches 24 may be dedicated to controlling other devices, such as activating/deactivating the lamp(s), unlocking a trunk, opening a rear hatch. Additional controls via the switches 24 may include actuating door power windows between open and closed positions. Various other vehicle controls may be controlled by way of the switches 24 described herein.

The overhead console 14 may further include a sunglass bin 40. The sunglass bin 40, as discussed herein, may include any form of storage bin, tray, or any other form of compartment configured to provide a selectively accessible storage pocket. In some examples, the sunglass bin 40 may be configured to have an interior portion configured to store glasses, sunglasses, or any other items having similar dimensional properties.

The console housing 18 may further include a hands-free phone assembly 42. The hands-free phone assembly 42 may include a speaker and/or a microphone. The microphone may be a unidirectional microphone or an array of microphones. If the microphone is a unidirectional microphone, the microphone is disposed, for example, in such a manner that the directivity thereof is directed toward the head of a passenger. An array microphone is a microphone in which multiple microphones are arranged close to each other in an array and whose directivity can be directed in any direction by signal processing.

One or more illuminable indicia 44 may also be disposed on the overhead console 14. The indicia 44 may provide any desired information to passengers of the vehicle 10. In some examples, the indicia 44 may be disposed on a backlit film. Each of the indicia 44 may be toggled between an illuminated and an unilluminated state to provide the status of a system that is designated by each respective indicium 44.

Figure 4A:
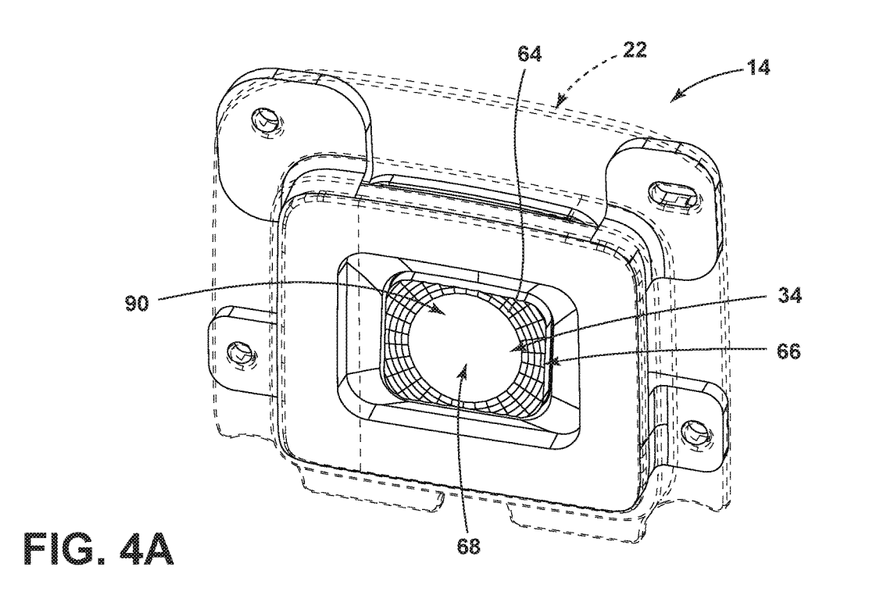
FIG. 4A is a bottom perspective view of the lamp having a first lens therein, according to some examples.
Figure 4B:
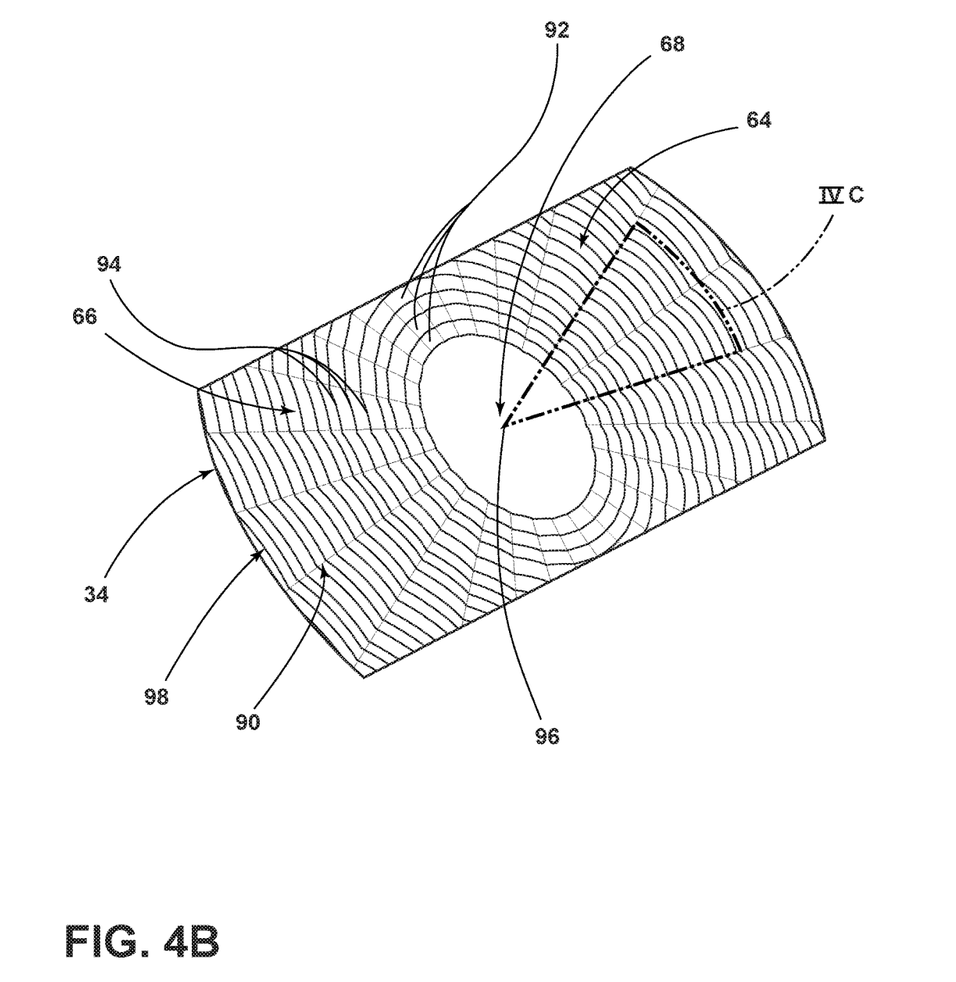
FIG. 4B is a bottom perspective view of the first lens, according to some examples.
Figure 4C:
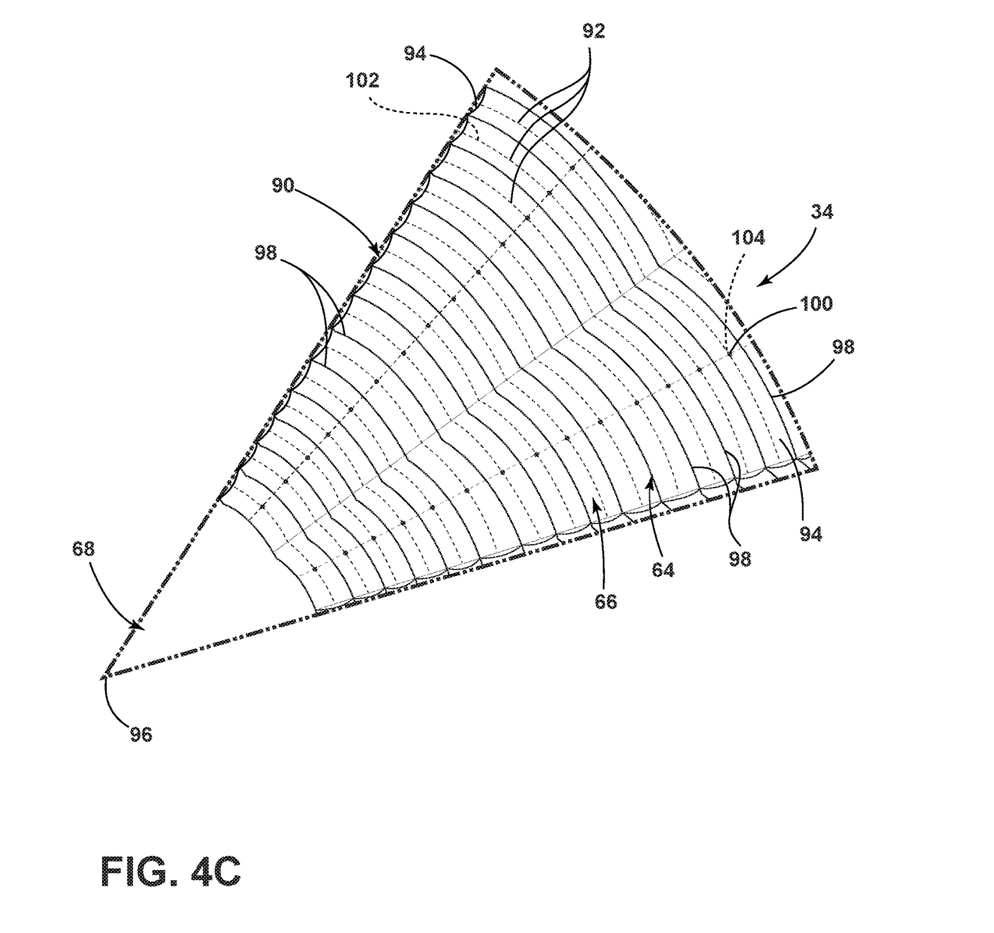
FIG. 4C is an enlarged perspective view of area IVC of FIG. 4A, according to some examples.
Figure 5:
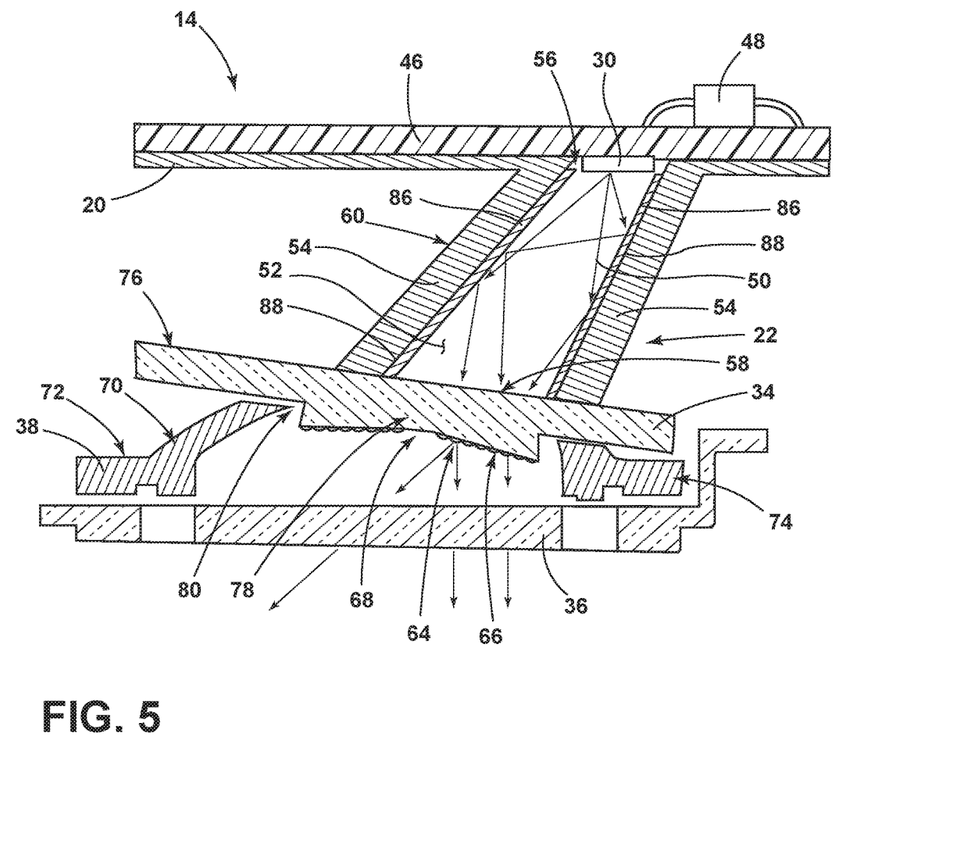
FIG. 5 is a cross-sectional view of the lamp taken along the line V-V of FIG. 3.
Figure 6:
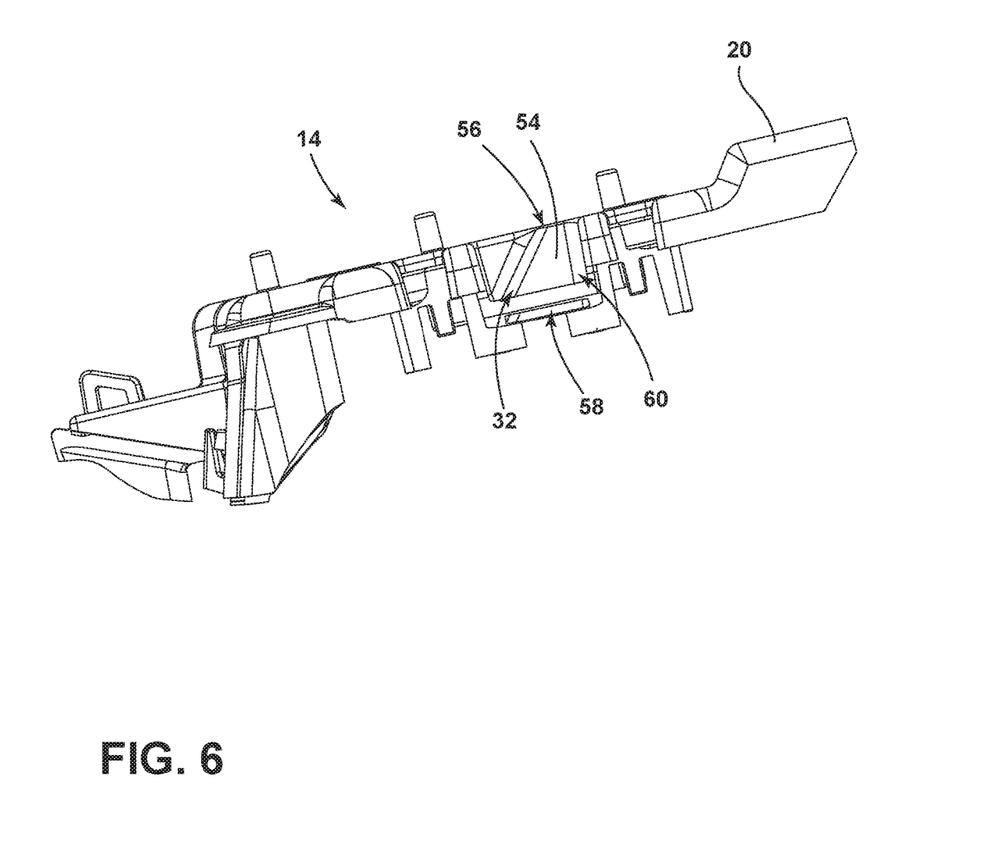
FIG. 6 is a side perspective view of the reflector and a substrate of the overhead console, according to some examples.

Referring to FIGS. 3-5, the reflector 32 may be integrally formed with the substrate 20 of the overhead console 14. The substrate 20 may couple with the housing 18 (FIG. 1) to define an exterior shape of the overhead console 14. The light source 30 is disposed within the overhead console 14 and is coupled to a circuit board 46. The circuit board 46 may be secured to and/or within the overhead console 14. The light source 30 may include any form of light source 30. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the overhead console 14. Further, various types of LEDs are suitable for use as the light source 30 including, but not limited to, top-emitting LEDs, side-emitting LEDs, and others. Moreover, according to various examples, multicolored light sources 30, such as Red, Green, and Blue (RGB) LEDs that employ red, green, and blue LED packaging may be used to generate various desired colors of light outputs from a single light source 30, according to known light color mixing techniques.

The circuit board 46 may be configured as a printed circuit board (PCB) that is operably coupled to a controller 48 including control circuitry including LED drive circuitry for controlling activation and deactivation of the light source 30. The controller 48 may be disposed in the vehicle 10 and/or within the overhead console 14. The circuit board 46 may be configured in any fashion known in the art including, but not limited to, any flexible PCB and/or rigid PCB. In some examples, the circuit board 46 may be a universal circuit board that controls multiple features of the overhead console 14. Commonly, a light source is disposed on a satellite circuit board within an overhead console 14. The lamp provided herein may include a light source 30 on a universal circuit board to reduce cost, weight, manufacturing costs, manufacturing times, etc.

The controller 48 may activate the light source 30 based on a plurality of inputs and may modify the intensity of the light 50 emitted by the light source 30 by pulse-width modulation, current control, and/or any other method known in the art. In various examples, the controller 48 may be configured to adjust a color and/or intensity of light 50 emitted from the light source 30 by sending control signals to adjust an intensity or energy output level of the light source 30. According to some examples, the controller 48 may increase the intensity of light 50 emitted from the light source 30 up to five times steady state.

The reflector 32 is configured to direct light 50 emitted from the light source 30 towards the vehicle compartment 12 (FIG. 1). The light 50 may be directed through a channel 52 defined by a body portion 60 of the reflector 32. The body portion 60 of the reflector 32 may include one or more sidewalls 54. The light source 30 is optically, or operably, coupled with the reflector 32 at a first end portion 56 of the body portion 60. A second end portion 58 of the body portion 60 is disposed proximately to the first lens 34. In some examples, the first end portion 56 may be positioned closer to a vehicle centerline 62 (FIG. 1) than the second end portion 58 of the body portion 60.

The first lens 34 is disposed proximately to the second end portion 58 of the body portion 60. The first lens 34 may be configured as a near field lens that may include optics 64 thereon. For example, the first lens 34 may be configured as a Fresnel lens, a pillow optic, and/or any other type of lens or optic that is configured to disperse, concentrate, and/or otherwise direct light 50 emitted from the light source 30 therethrough in any desired manner.

The trim member 38 may be disposed on an opposing side of the first lens 34 from the reflector 32. The trim member 38 may provide any desired styling through a decorative material 70 disposed thereon and/or therein. In various examples, the decorative material 70 may confer a plurality of various patterns, textures, colors, etc. The decorative material 70 can provide a desired aesthetic appearance through any method known in the art, including, but not limited to, sputter deposition, vacuum deposition (vacuum evaporation coating), electroplating, and/or printing a material onto the trim member 38. The decorative material 70 may be chosen from a wide range of materials and/or colors, including, but not limited to, silver, chrome, copper, bronze, gold, or any other metallic surface. Additionally, an imitator of any metallic material may also be utilized without departing from the teachings provided herein. Moreover, the trim member 38 may be otherwise colored any other color through any other process known in the art without departing from the scope of the present disclosure.

In various examples, the trim member 38 may have a textured or grained surface. The grained surface may be produced by laser etching the trim member 38 and may provide the trim member 38 with a varied or common appearance to proximately disposed components of the overhead console 14. Likewise, any other component of the overhead console 14 may be colored any desired color and/or have a textured or grained surface that is similar or varied from the trim member 38.

The second lens 36 may be disposed on an opposing side of the trim member 38 from the first lens 34. The second lens 36 may obstruct a passenger's view of the reflector 32 and/or the first lens 34 from a position below the overhead console 14, once the overhead console 14 is disposed within the vehicle 10. In some examples, the second lens 36 also includes optics 64 therein. In other examples, the second lens 36 may be configured as a flat member.

In some examples, the second lens 36 may be configured as a diffuser that is designed to break up and distribute light 50 emitted from the light source 30 evenly so that hot spots and shadows may be minimized. Accordingly, the second lens 36 may have any desired light transparency and haze. For example, the second lens 36 may have a light transparency between 30% and 95% and a haze that may be above 70%, particularly above 75%, and more particularly 80% or above. It will be appreciated that in some examples, the overhead console 14 may be free of the second lens 36. Furthermore, the reflector 32, the first and second lenses 34, 36, and the trim member 38 may be formed of various polymeric materials and metallic materials, as well as fiberglass, carbon fiber, fabric, and any other materials suitable for implementation in the vehicle 10. For example, the first and/or second lens 34, 36 may be formed from a transparent and/or translucent polycarbonate. The first and/or second lens 34, 36 may provide protection and decorative function to the lamp assembly. Additionally, in some instances, the first and/or second lenses 34, 36 can be designed with optical function.

As illustrated in FIGS. 4A-4C, in some examples, the first lens 34 is formed from a base structure 90 and may have the radial portion 66 having an integrally formed optic 64 thereon and a central portion 68 having a generally flat surface, which may form a spider-web-like structure. In some instances, the first lens 34 can be decorative, while allowing light emitted by the light source 30 to be transmitted therethrough. In some instances, the first lens 34 may have optical function and may combine with the reflector 32 and/or the second lens 36 within the lamp assembly 22. Moreover, the first lens 34 may be utilized with a point light source, such as the light source 30 described herein, or with parallel light (e.g., collimated light within the reflector 32).

In some examples, the optics 64 include alternating ridges 92 and grooves 94. The grooves 94 may extend radially from a central point 96. Moreover, a plurality of concentrically aligned channels 98 intersects the plurality of grooves 94. As used herein, "concentric" means that the channels are to be coaxial when they share the same central point 96. In some examples, any one of the channels 98 and two adjacent grooves 94 define the sector. A sector is a part of a circle enclosed by two radii, or grooves 94, of the circle and an intercepted defined by the outer channel 98a thereby forming a pie-shaped part of a circle. Each sector includes one or more ridges 92 that extend outwardly from the grooves 94. In some instances, light emitted by the light source 30 that strikes the ridges 92 at incident angles of about 0 degrees passes through the first lens 34 without substantial diversion. This occurs at a summit 100, or peak, of each ridge 92. But as the sloping sides of each ridge 92 are approached, this incident angle increases and the degree of diversion increases. Similarly, light emitted from the light source 30 that strikes the groove 94 at or near the center of the groove 94 passes through the first lens 34 without substantial diversion, but as the edges of each groove 94 are approached, the incident angle again may increase and the degree of diversion may also increase.

Still referring to FIGS. 4A-4C, each ridge 92 may have a curved outer surface. The outer surface may be curved in a first direction between two adjacent grooves 94 with the summit 100 being disposed at a center portion of the ridge 92, as indicated by line 102. Moreover, the first direction may be substantially aligned with the concentric channels 98. Moreover, each ridge 92 may be additionally, and/or alternatively, be curved in a second direction, as indicated by line 104. The second direction may be substantially aligned with the grooves 94. In such instances, the summit 100 may be a center point between two channels 98 disposed on opposing sides of the ridge 92. It will be appreciated, however, that each ridge 92 may have a unique outer surface geometry that is flat, curved, or otherwise varied in a non-linear orientation. Moreover, each ridge 92 may be curved in the first and/or second direction without departing from the scope of the present disclosure. In some examples, the curved orientation of each ridge includes a central portion that extends further outward than outer portions of each ridge 92, wherein the outer portions are proximate to the plurality of grooves 94.

When the grooves 94 circumferentially extend from the central point 96 and the channels 98 are disposed in concentric circles of various sizes, a spider-web pattern may be formed on various portions thereof. The spider-web pattern can be on the whole first lens 34 or a portion of the first lens 34 may have a varied pattern. For example, the first lens 34 may have the central portion 68 that may be substantially or generally flat. Additionally, and/or alternatively, the central portion 68 may include a diffuser that is configured to diffuse light emitted by the light source 30 and through the reflector 32. The radial portion 66 of the lens and the central portion 68 may be of any size to meet any styling demand, an optical efficiency, and/or direct light towards a desired target location. Moreover, the radial portion 66 and/or central portion 68 of the first lens 34 may assist in concealing various phosphors that may be disposed on the light source 30. It will be appreciated that the plurality of grooves 94, the ridges 92, and the concentric channels 98 may be integrally formed with the housing that forms the first lens 34 and/or attached thereto. Moreover, any other lens 34, 36 within the lamp assembly may also be formed with the radial and central portions 66, 68 described herein without departing from the scope of the present disclosure.

Referring to FIG. 5, the circuit board 46 may be disposed above the substrate 20. The reflector 32 may be integrally formed with, or attached to, the substrate 20 on the first end portion 56 thereof. The second end portion 58 of the reflector 32 is operably coupled with the first lens 34. The first lens 34 may be offset from the substrate 20. In other words, when one component is offset from another component, the two components are oriented in a non-parallel orientation to one another. The trim member 38 is disposed on an opposing side of the first lens 34 from the reflector 32. In some examples, the trim member 38 has a varied thickness such that a first portion 72 of the trim member 38 has a first thickness and a second portion 74 of the trim member 38 has a second thickness. In some instances, the first thickness may be less than, or greater than, the second thickness. The second lens 36 is disposed on an opposing side of the trim member 38 from the first lens 34. In some examples, the first lens 34 may be offset from (i.e., non-parallel to) the second lens 36.

In some examples, the first lens 34 has an outer region 76 having a first thickness and a central region 78, containing the radial portion 66 and the central portion 68, having a second thickness. The second thickness may be greater than the first thickness and may be disposed within a cavity 80 of the trim member 38. Moreover, one or more locators 82 (FIG. 3) may be integrally formed with the trim member 38 and extend through one or more respective voids 84 (FIG. 3) in the first lens 34.

Referring to FIGS. 6-10, in various examples, the reflector 32 has a shape aspect of a quadrilateral frustum. A frustum is the portion of a hollowed solid (e.g., a pyramid, cone, and the like) that lies between two planes cutting through the solid and defines a first opening and a second opening. The top plane may be offset from the bottom plane. However, in alternate examples, the top and bottom planes may be parallel to one another. In the reflector 32 illustrated in FIGS. 6-10, the quadrilateral frustum reflector 32 is composed of an offset pyramid having a polygon as its base. As such, the body portion 60 of the reflector 32 includes four reflector sidewalls 54 corresponding to the shape aspect of the reflector 32. In some examples, the sidewalls 54 may have radiused corners between intersecting sidewalls 54. The radiused corners may assist in forming of the reflector 32 as a single component. In various examples, the reflector 32 may have a shape aspect of another polygonal frustum such as triangular, pentagonal, hexagonal, and the like and the number of reflector sidewalls 54 may correspondingly be three, five, six, and the like, respectively. Moreover, the shape of the first opening and the second opening may correspondingly be triangular, pentagonal, hexagonal, and the like.

Figure 7:
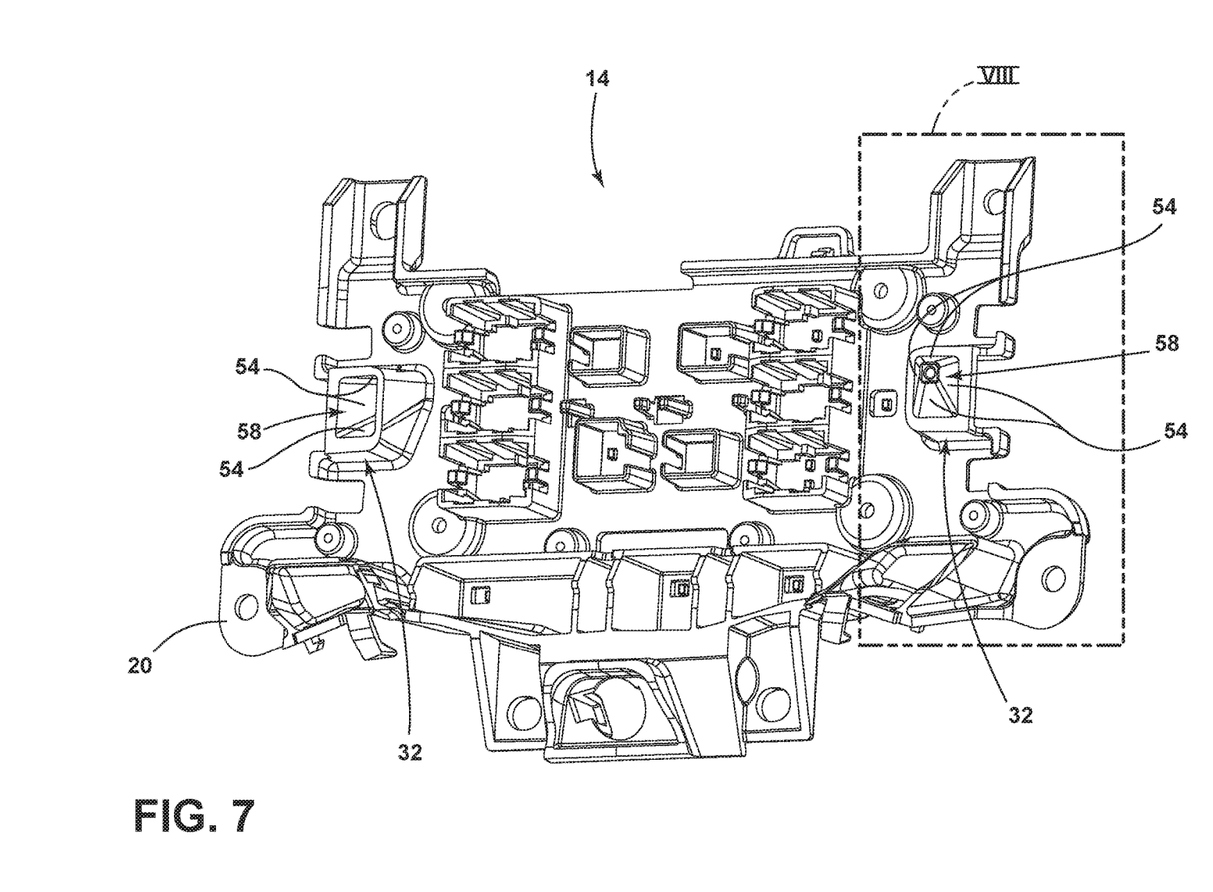
FIG. 7 is a top perspective view of the substrate and the reflector, according to some examples.
Figure 8:
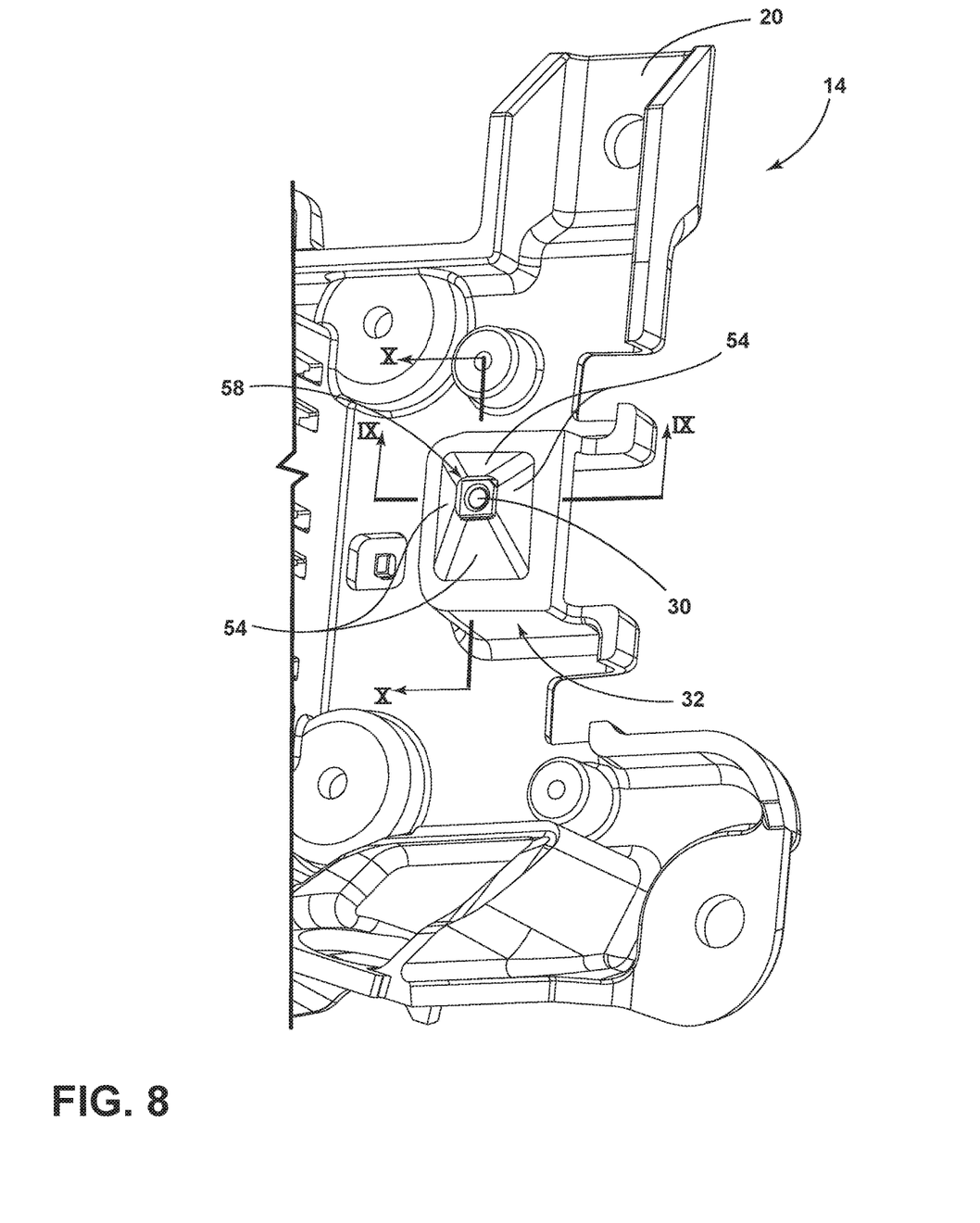
FIG. 8 is an enhanced perspective view of area VIII of FIG. 7 illustrating the reflector and the substrate, according to some examples.
Figure 9:
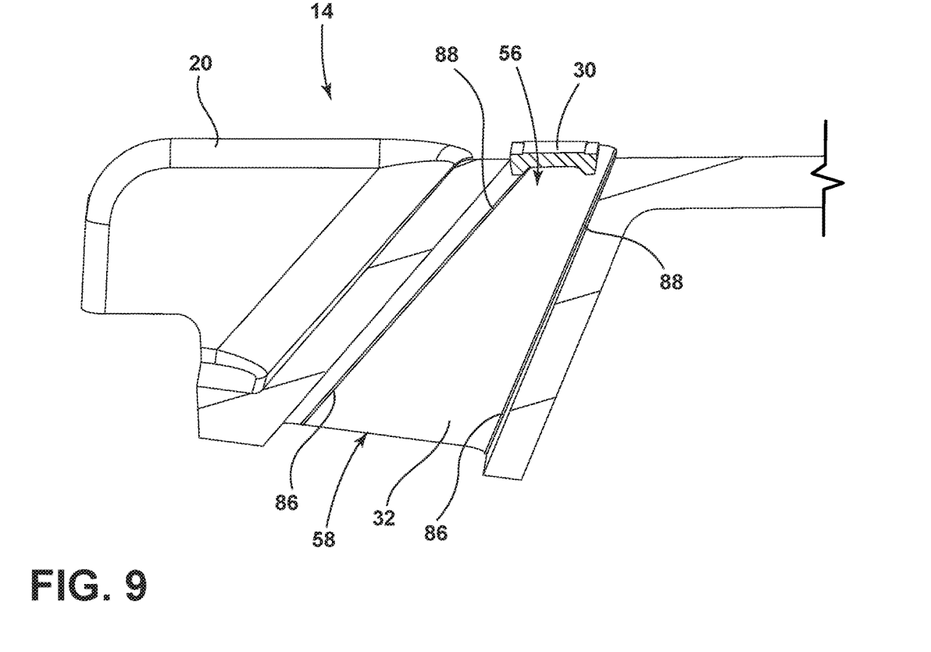
FIG. 9 is a cross-sectional view of the reflector taken along the line IX-IX of FIG. 8.
Figure 10:
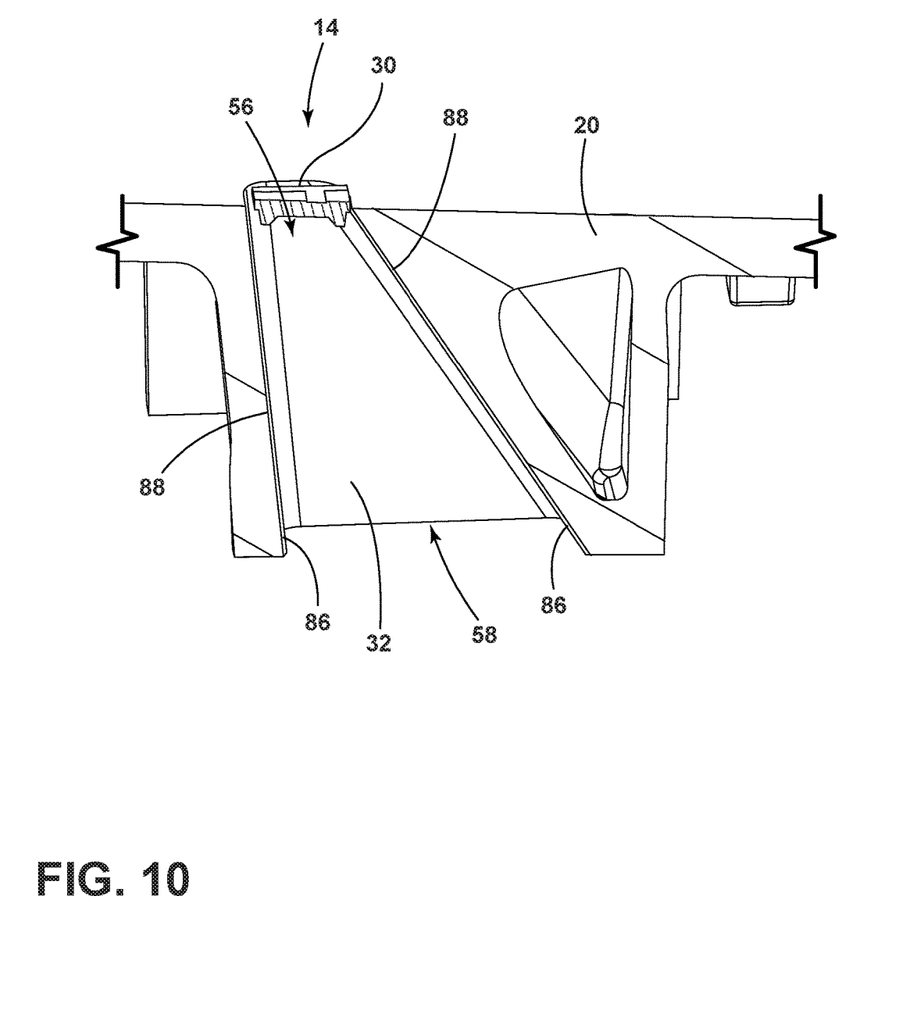
FIG. 10 is a cross-sectional view of the reflector taken along the line X-X of FIG. 8.

Referring to FIG. 7, the substrate 20 may include a pair of reflectors 32 that extend in opposing, laterally outward directions. It will be appreciated, however, that the reflectors 32 may extend in any desired direction without departing from the scope of the present disclosure. In some examples, the pair of reflectors 32 may be mirror images of one another. However, in alternate examples, the pair of reflectors 32 may have varied geometries without departing from the scope of the present disclosure.

With reference to FIGS. 6-10, a reflective material 86 may be disposed on and/or within one or more interior surfaces 88 of the body portion 60. The reflective material 86 generally functions to redirect light 50 (FIG. 5) emitted from the light source 30 through the reflector 32 and towards a desired location within the vehicle compartment 12. It will be appreciated that the reflective material 86 may be reflective and/or retroreflective. Accordingly, in examples where the reflective material 86 has reflective properties, the light 50 emitted from the light source 30 may be spread, refracted, and/or scattered as the light 50 emitted from the light source 30 passes therethrough.

According to some examples, the reflective material 86 is a coating, such as a boron nitride, aluminum oxide, zirconium oxide, and/or any other practicable material that reflects the light 50 emitted by the light source 30. It is noted that the reflective material 86 could be disposed on other portions of the substrate 20 to direct or reflect light 50 emitted from the light source 30 in a desired direction and/or to minimize radiation from being emitted in an undesired direction. The reflective material 86 may reflect more than 90% of the light 50 emitted from the light source 30. In examples of the reflective material 86 that include boron nitride, the boron nitride particles may be of a relatively small size. A small particle size is advantageous, since it may lead to an overall decreased weight content of boron nitride in the composition, which not only results in a more cost-effective and more environmentally friendly composition but also a composition that may be easier to produce.

With further reference to FIGS. 6-10, the reflective material 86 may further include reflective particles including a metal oxide. Examples of metal oxide particles that may be used in the composition, in addition to the particles including boron nitride, include, but are not limited to, aluminum oxide and yttrium oxide. The particles including boron nitride and any further particles including metal oxide may be present in the reflective composition at any desired weight ratios relative to each other. The reflective material 86 may be used to direct the light 50 emitted from the light source 30 in a desired output direction.

Referring still to FIGS. 6-10, the reflector 32 may be integrally formed with another component of the overhead console 14, such as the substrate 20. For example, the reflector 32 may be molded as part of or into a material forming the substrate 20 and/or any other component of the overhead console 14. According to other examples, the reflector 32 may be formed as a separate component and assembled to the overhead console 14. In such embodiments, the reflector 32 may be fixedly mounted to the overhead console 14 via fasteners, adhesive or other mounting connection and generally does not move relative to the overhead console 14.

In some examples, the substrate 20 and the reflector 32 may be integrally formed through an injection molding process. In injection-molded examples, the contour of the reflector 32 allows for the reflector 32 to be integrally formed. For example, the trapezoidal shape of the reflector 32 may allow for an injection mold tool to form the substrate 20 and the reflector 32 without the need for any additional steps, fasteners, or components in attaching the substrate 20 to the reflector 32.

Use of the present disclosure may offer a variety of advantages. For instance, use of the lamp assembly may efficiently provide illumination in the desired location within a vehicle compartment of the vehicle. The lamp assembly may incorporate a reflector that may be integrally formed with one or more components of overhead components. The reflector may be operably coupled with a lens that includes a spider-web pattern. The spider-web pattern may be disposed on a radial portion of the lens and a central portion may have varied optics to create unique styling of the lamp assembly and/or desired performance.

According to one aspect of the present disclosure, a lens for a lamp assembly is provided herein. The lens includes a base structure defining a radial portion including a plurality of grooves extending radially from a central point and a plurality of concentrically aligned channels intersecting the plurality of grooves. An outer channel and two adjacent grooves define a sector. Each sector includes one or more ridges. A central portion of the base structure includes a generally flat outer surface. Examples of the lens for a lamp assembly can include any one or a combination of the following features:
- the reflector is configured as a frustum reflector;
- the base structure is operably coupled with a reflector;
- the base structure is operably coupled with a light source;
- the central portion is configured to diffuse light emitted by the light source;
- each ridge is curved in a first direction that is substantially aligned with the concentrically aligned channels;
- each ridge is curved in a second direction that is substantially aligned with the grooves;
- the base structure is configured to at least partially conceal a phosphor disposed on the light source;
- light emitted by the light source that strikes the ridges proximate a summit at incident angles of about zero degrees passes through the ridges without substantial diversion;
- light emitted from the light source that strikes the plurality of grooves near a center of the groove passes through the plurality of grooves without substantial diversion;
- each ridge includes a central portion that extends further outward than outer portions of each ridge, the outer portions proximate to the plurality of grooves; and/or
- the plurality of grooves, the ridges, and the concentrically aligned channels are integrally formed with the base structure.

Moreover, a method of manufacturing a base structure for a lamp assembly is provided herein. The method includes forming a radial portion including a plurality of grooves extending radially from a central point. A plurality of concentrically aligned channels are formed that intersect the plurality of grooves. An outer channel and two adjacent grooves define a sector. Each sector includes one or more ridges. A central portion of the base structure is formed and includes a generally flat outer surface.

According to another aspect of the present disclosure, an overhead console for a vehicle is provided herein. The overhead console includes a light source operably coupled to a reflector. A first lens operably is coupled with the reflector and includes a central portion with a generally flat outer surface and a radial portion with a plurality of grooves extending radially from a central point and a plurality of concentrically aligned channels intersecting the plurality of grooves. Examples of the overhead console for a vehicle can include any one or a combination of the following features:
- the outer channel and two adjacent grooves define a sector and each sector includes one or more ridges;
- the central portion is configured to diffuse light emitted by the light source;
- each ridge is curved in a first direction that is substantially aligned with the concentrically aligned channels; and/or
- each ridge is curved in a second direction that is substantially aligned with the grooves.

According to yet another aspect of the present disclosure, an overhead console for a vehicle is provided herein. The overhead console includes a light source is operably coupled with a base structure. The base structure includes a plurality of grooves extending radially from a central point and a plurality of concentrically aligned channels intersecting the plurality of grooves. Examples of the overhead console for a vehicle can include any one or a combination of the following features:
- the light source is operably coupled with a frustum reflector that is configured as an offset pyramid having a polygon as its base, wherein the frustum reflector is integrally formed with the base structure;
- the plurality of grooves and the plurality of concentrically aligned channels are disposed on a radial portion of the base structure; and/or
- the base structure includes a central portion including a generally flat outer surface.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lens for a lamp assembly, the lens comprising:
    a base structure defining a radial portion including a plurality of grooves extending radially from a central point and a plurality of concentrically aligned channels intersecting the plurality of grooves, an outer channel and two adjacent grooves defining a sector, wherein each sector includes one or more ridges; and
    a central portion of the base structure including a generally flat outer surface, wherein the base structure is operably coupled with a light source, and wherein light emitted by the light source that strikes the one or more ridges proximate a summit at incident angles of about zero degrees passes through the one or more ridges without substantial diversion.

2. The lens for a lamp assembly of claim 1, wherein the base structure is operably coupled with a reflector.

3. The lens for a lamp assembly of claim 1, wherein the central portion is configured to diffuse light emitted by the light source.

4. The lens for a lamp assembly of claim 1, wherein each ridge is curved in a first direction that is substantially aligned with the concentrically aligned channels.

5. The lens for a lamp assembly of claim 4, wherein each ridge is curved in a second direction that is substantially aligned with the grooves.

6. The lens for a lamp assembly claim 1, wherein the plurality of grooves, the ridges, and the concentrically aligned channels are integrally formed with the base structure.

7. The lens for a lamp assembly of claim 1, wherein the base structure is configured to at least partially conceal a phosphor disposed on the light source.

8. The lens for a lamp assembly of claim 1, wherein each ridge includes a central portion that extends further outward than outer portions of each ridge, the outer portions proximate to the plurality of grooves.

9. A lens for a lamp assembly, the lens comprising:
    a base structure defining a radial portion including a plurality of grooves extending radially from a central point and a plurality of concentrically aligned channels intersecting the plurality of grooves, an outer channel and two adjacent grooves defining a sector, wherein each sector includes one or more ridges; and
    a central portion of the base structure including a generally flat outer surface, wherein the base structure is operably coupled with a light source, and wherein light emitted from the light source that strikes the plurality of grooves near a center of the groove passes through the plurality of grooves without substantial diversion.

10. An overhead console for a vehicle, comprising:
    a light source operably coupled to a reflector;
    a first lens operably coupled with the reflector and including a central portion with a generally flat outer surface and a radial portion with a plurality of grooves extending radially from a central point and a plurality of concentrically aligned channels intersecting the plurality of grooves, wherein light emitted from the light source that strikes the plurality of grooves near a center of the groove passes through the plurality of grooves without substantial diversion.

11. The overhead console for a vehicle of claim 10, wherein the outer channel and two adjacent grooves define a sector and each sector includes one or more ridges.

12. The overhead console for a vehicle of claim 10, wherein the central portion is configured to diffuse light emitted by the light source.

13. The overhead console for a vehicle of claim 11, wherein each ridge is curved in a first direction that is substantially aligned with the concentrically aligned channels.

14. The overhead console for a vehicle of claim 11, wherein each ridge is curved in a second direction that is substantially aligned with the grooves.

15. The overhead console for a vehicle of claim 11, wherein light emitted by the light source that strikes the one or more ridges proximate a summit at incident angles of about zero degrees passes through the one or more ridges without substantial diversion.

* * * * *